(No Model.)
S. LEMSTRÖM.
MEANS FOR PROMOTING VEGETATION.
No. 525,988. Patented Sept. 11, 1894.
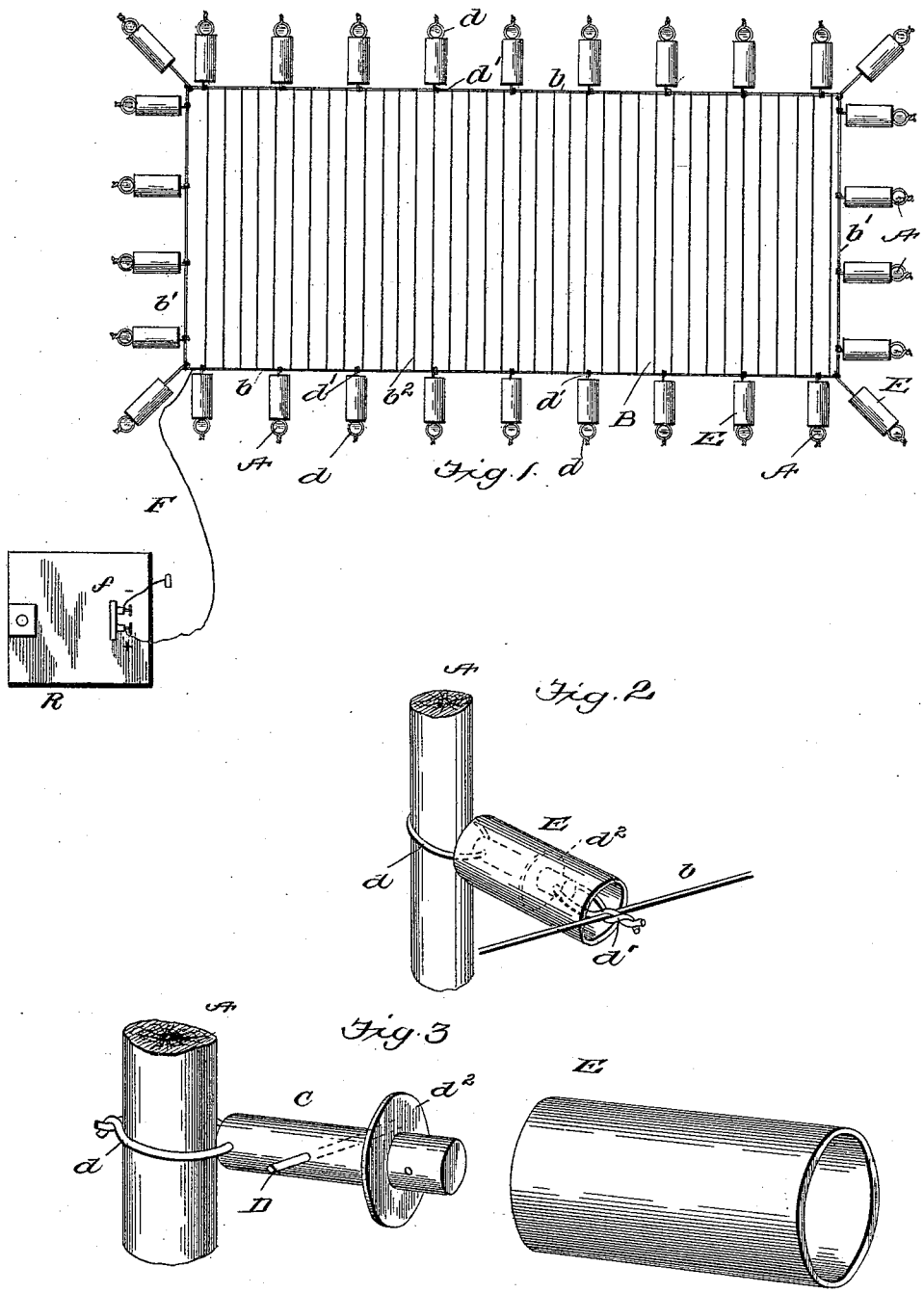

UNITED STATES PATENT OFFICE.

SELIM LEMSTRÖM, OF HELSINGFORS, FINLAND.

MEANS FOR PROMOTING VEGETATION.

SPECIFICATION forming part of Letters Patent No. 525,988, dated September 11, 1894.

Application filed October 17, 1893. Serial No. 488,359. (No model.) Patented in France September 5, 1888, No. 192,805.

*To all whom it may concern:*

Be it known that I, SELIM LEMSTRÖM, a subject of the Czar of Russia, as Grand Duke of Finland, residing at Helsingfors, Finland, have invented certain new and useful Improvements in Means for Promoting Vegetation; and I do hereby declare the following to be a full, clear, and exact description of the invention, such as will enable others skilled in the art to which it appertains to make and use the same, and for which I have obtained Letters Patent of France, dated September 5, 1888, No. 192,805.

This invention contemplates certain new and useful improvements in means of promoting vegetation.

The object of the invention is to provide simple and inexpensive means for augmenting or hastening the growth of vegetables and the like by the application or distribution of electricity over the field in which the vegetables are growing and in close proximity to the latter, whereby the principal effect is that the surrounding air is transformed into or charged with ozone and nitric compounds which upon coming in contact with the growing vegetables will be absorbed by them, thus exciting the vegetative life.

The invention consists of a wire-net stretched over or across a field of growing vegetables, vertically adjustable supports for said wire-net, and a generator connected to said wire-net, whereby the latter is charged with electricity and the surrounding air is charged with ozone and nitric compounds.

The invention further comprises a wire-net stretched over or across a field of growing vegetables, and connected by suitable insulators to periodically arranged supporting posts upon which it can be adjusted relatively to the growing vegetables, and an electric engine or current generator connected to said wire-net at some suitable point, substantially as hereinafter fully set forth and particularly pointed out in the claims.

In the accompanying drawings:—Figure 1 is a plan view. Fig. 2 is an enlarged detail view of a portion of one of the posts and an insulator. Fig. 3 shows the insulator and its inclosing cylinder, the latter being removed.

Referring to the drawings, A designates a series of posts which are arranged at suitable distances apart surrounding the edges of a field of growing vegetables and braced from within the field.

B is a net-work which is extended over the field and supported at the proper height by posts A. This net-work is composed of side-wires $b$ and end-wires $b'$. The former are connected together by transverse wires $b^2$ which are parallel with the end-wires $b'$. The net is connected to the posts A by insulators C of suitable material through openings near the ends of which are passed wire loops $d, d'$, the former being passed around the outer wire of the net and the latter around the adjacent post. In this way the net may be raised or lowered according to the height of the growing vegetables with which the net must not be in contact. Through an opening in each insulator C near one end thereof is passed a rod D which extends beyond said insulator a suitable distance, and near the other end of such insulator is located a circular disk $d^2$. An inclosing cylinder E made preferably of asphalt-paper is designed to inclose each insulator and its connecting wires, the same being held out of contact with the latter by means of the tranvserse rod D and the disk $d^2$. By means of these inclosing cylinders the insulators are protected from dew and rain.

To the wire-net at any suitable point is connected an electric wire F which leads from an electric engine or generator $f$ located in a room or building R which latter should be kept dry and heated if necessary and as free from dust as possible. Any preferred form of electric engine may be employed for producing a high difference of potential. The negative or cathode pole of the machine is connected with the earth and the positive or anode to the wire F leading to the wire-net. If a common electric machine is used it must be charged before connecting the wire F. If the wire-net is to extend over a field of very large area, any suitable means may be employed for keeping the wires taut and preventing the same from sagging; but it is preferable over large areas to erect a series of wire-nets, all of which can be charged by the same electric engine. The consequence of the high potential on the wire-net is that the electricity is forced out from or given off by the wire-net into the surrounding air and through the vegetables into the earth. By the electric current the air is transformed into or heavily charged with ozone and nitric compounds which fall down on the vegetables and are absorbed by the latter. In this way the vegetative life is excited and the growth of the vegetables is greatly augmented. On clear, hot, sunny days, the electricity should be applied only for a short time in the morning and afternoon. During cloudy days it can be applied at intervals for a longer period.

The advantages of my invention are apparent to those skilled in the art to which it appertains, and it will be specially observed that the means employed are simple and inexpensive and that the method is capable of being readily and easily carried into effect.

I claim as my invention—

1. The combination with the series of posts, of the wire-net supported thereby and capable of being raised or lowered, and an electrical generator connected to said wire-net, substantially as set forth.

2. The combination with the series of posts, of the wire-net, the series of insulators connected to said posts and also to said net, and the electric generator electrically-connected to said wire-net, substantially as set forth.

3. The combination with the series of posts, of the wire-net, the series of insulators connected to said posts and to said net, the cylinders inclosing said insulators, and the electric generator electrically-connected to said wire-net, substantially as set forth.

4. The combination with the series of posts, of the wire-net, the series of insulators, the wire loops connecting said insulators to said posts and to the net, the transverse rod, the disk, the inclosing cylinders, and the electric generator electrically connected to the said wire-net, substantially as set forth.

In testimony whereof I have signed this specification in the presence of two subscribing witnesses.

SELIM LEMSTRÖM.

Witnesses:
J. NOTA McGILL,
WM. S. HODGES.